United States Patent
Lin et al.

(10) Patent No.: US 9,659,133 B2
(45) Date of Patent: May 23, 2017

(54) METHOD, SYSTEM AND COMPUTER PROGRAM PRODUCT FOR GENERATING LAYOUT FOR SEMICONDUCTOR DEVICE

(71) Applicant: TAIWAN SEMICONDUCTOR MANUFACTURING COMPANY, LTD., Hsinchu (TW)

(72) Inventors: Yen-Hung Lin, Hsinchu (TW); Chi Wei Hu, Pingzhen (TW); Yuan-Te Hou, Hsinchu (TW); Chung-Hsing Wang, Baoshan Township (TW); Chin-Chou Liu, Jhubei (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 14/056,420

(22) Filed: Oct. 17, 2013

(65) Prior Publication Data

US 2015/0113493 A1 Apr. 23, 2015

(51) Int. Cl.
*G06F 17/50* (2006.01)

(52) U.S. Cl.
CPC ...... *G06F 17/5077* (2013.01); *G06F 17/5072* (2013.01)

(58) Field of Classification Search
USPC .......................................................... 716/126
See application file for complete search history.

(56) References Cited

U.S. PATENT DOCUMENTS

| | | | |
|---|---|---|---|
| 7,013,438 B1 * | 3/2006 | Saldanha | G06F 17/505 716/104 |
| 8,443,324 B2 * | 5/2013 | Alpert et al. | 716/126 |
| 2004/0216067 A1 * | 10/2004 | Tanaka et al. | 716/10 |
| 2011/0055791 A1 * | 3/2011 | Gao | 716/131 |
| 2011/0161904 A1 * | 6/2011 | Kondou et al. | 716/114 |

* cited by examiner

*Primary Examiner* — Eric Lee
(74) *Attorney, Agent, or Firm* — Hauptman Ham, LLP

(57) ABSTRACT

A method is performed at least in part by at least one processor. In the method, a plurality of circuit elements are placed in a layout for a semiconductor device, the plurality of circuit elements having a plurality of pins. A layer assignment is generated to assign a plurality of interconnections to corresponding conductive layers of the semiconductor device, the plurality of interconnections connecting corresponding pairs of pins among the plurality of pins. The plurality of interconnections is routed in the layout in accordance with the layer assignment.

20 Claims, 7 Drawing Sheets

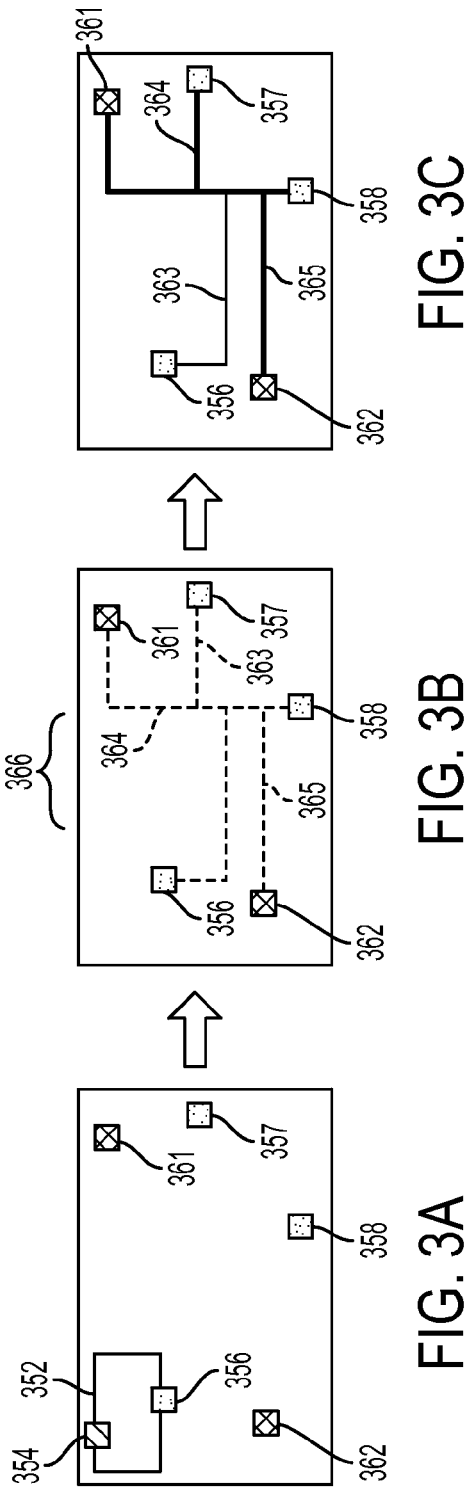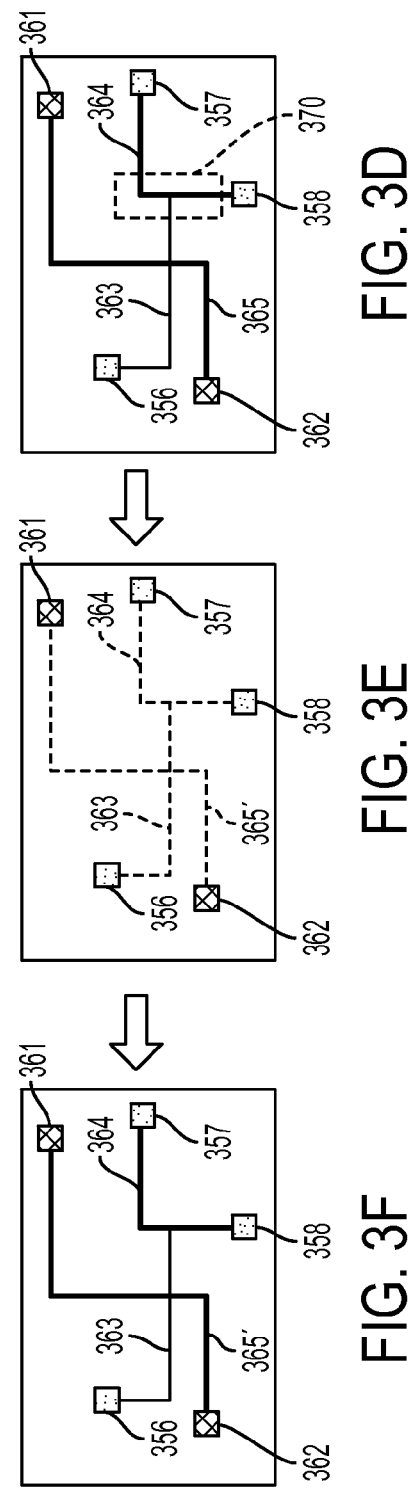

METHOD, SYSTEM AND COMPUTER PROGRAM PRODUCT FOR GENERATING LAYOUT FOR SEMICONDUCTOR DEVICE

BACKGROUND

The recent trend in miniaturizing integrated circuits (ICs) has resulted in smaller devices which consume less power, yet provide more functionality at higher speeds than before. The miniaturization process has also resulted in stricter design and manufacturing specifications. Various electronic design automation (EDA) tools are developed to generate, optimize and verify designs for semiconductor devices while ensuring that the design and manufacturing specifications are met.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

FIGS. 3A-3F are schematic views of a portion of a layout for a semiconductor device being developed at various stages by a placement and routing tool in accordance with some embodiments.

DETAILED DESCRIPTION

Figure 1:
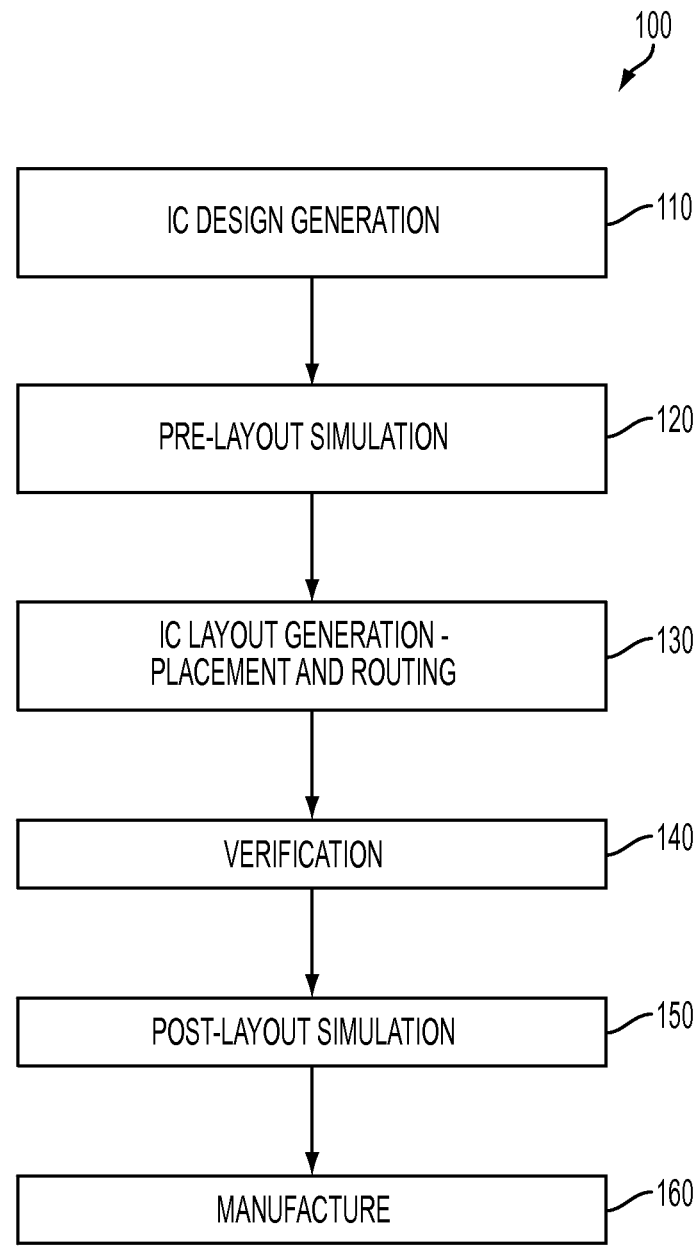
FIG. 1 is a functional flow chart of at least a portion of a semiconductor device design process in accordance with some embodiments.

It is to be understood that the following disclosure provides many different embodiments or examples, for implementing different features of various embodiments. Specific examples of components and arrangements are described below to simplify the present disclosure. An inventive concept may; however, be embodied in many different forms and should not be construed as being limited to the embodiments set forth herein. It will be apparent, however, that one or more embodiments may be practiced without these specific details. Like reference numerals in the drawings denote like elements.

In some embodiments, a placement and routing tool first places various circuit elements of a semiconductor device in a layout. The placement and routing tool then generates a layer assignment to assign, without yet routing, interconnections for connecting the circuit elements to corresponding conductive layers of the semiconductor device. The placement and routing tool further routes the interconnections in the layout in accordance with the layer assignment. Because information about the conductive layers on which the interconnections are to be routed is available in such an early stage of the design process, it is possible to estimate time delays of the interconnections, e.g., even before the interconnections are routed, based on specific resistances and/or capacitances of the conductive layers to which the interconnections are assigned. Compared to other approaches where a single derived capacitance and a single derived resistance are used for all conductive layers for timing estimation purposes, the described approach in accordance with some embodiments provides a more accurate timing analysis and/or estimation which further improves accuracy and/or efficiency of the subsequent design stages.

FIG. 1 is a functional flow chart of at least a portion of a semiconductor device design process 100 in accordance with some embodiments. The design process 100 utilizes one or more EDA tools for generating, optimizing and verifying a design of a semiconductor device before manufacturing the same device. The EDA tools, in some embodiments, are one or more sets of executable instructions for execution by a processor or controller or a programmed computer to perform the indicated functionality.

At operation 110, a design of a semiconductor device is provided by a circuit designer. In some embodiments, the design of the semiconductor device includes a schematic, i.e., an electrical diagram, of the semiconductor device. In some embodiments, the schematic is generated or provided in the form of a schematic netlist.

At operation 120, a pre-layout simulation is performed on the design to determine whether the design meets a predetermined specification. If the design does not meet the predetermined specification, the semiconductor device is redesigned.

At operation 130, a layout of the semiconductor device is generated based on the design. The layout includes the physical positions of various circuit elements of the semiconductor device as well as the physical positions of various nets interconnecting the circuit elements. In some embodiments, the layout is generated by a placement and routing tool described herein.

At operation 140, one or more verifications and/or checks is/are performed. For example, a layout-versus-schematic (LVS) check, is performed to ensure that the generated layout corresponds to the design. For another example, a design rule check (DRC) is performed to ensure that the layout satisfies certain manufacturing design rules, i.e., to ensure that the semiconductor device can be manufactured. If one of the checks fails, correction is made to at least one of the layout or the design by returning the process to operation 110 and/or operation 130.

At operation 150, a post-layout simulation is performed to determine whether the layout meets a predetermined specification. If the simulation indicates that the layout does not meet the predetermined specification, e.g., if there are undesirable time delays, correction is made to at least one of the layout or the design by returning the process to operation 110 and/or operation 130. Otherwise, the layout is passed to manufacture at operation 160. In some embodiments, one or more of the above-described operations are omitted. For example, the pre-layout simulation at operation 120 and/or the post-layout simulation at operation 150 is/are omitted in one or more embodiments.

Figure 2:
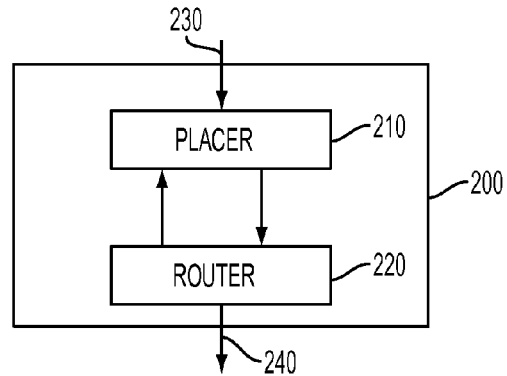
FIG. 2 is a block diagram of a placement and routing tool in accordance with some embodiments.

FIG. 2 is a block diagram of a placement and routing tool 200 in accordance with some embodiments. The placement and routing tool 200 is configured to generate a layout for a semiconductor device. In some embodiments, the semiconductor device includes a plurality of circuit elements and a plurality of nets interconnecting the circuit elements. A circuit element is an active element or a passive element. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.), FinFETs, planar MOS transistors with raised source/drains. Examples of passive elements include, but are not limited to, capacitors, inductors, fuses, and resistors. In some embodiments, a circuit element has one or more pins, from which electrical signals are inputted into or outputted from the circuit element. Pins from which electrical signals are outputted are referred to as driver pins. Pins into which electrical signals are inputted are referred to as receiver pins. In some embodiments, a pair of pins is electrically connected to each other by an interconnection. A set of electrically connected interconnections forms a net. It is possible that a net includes a single interconnection. The semiconductor device includes a number of conductive layers in which the interconnections are formed. In some embodiments, an interconnection is a conductive pattern formed in at least one conductive layer of the semiconductor device. The conductive layers are alternatingly arranged with dielectric layers over the circuit elements, and are electrically connected with the circuit elements, e.g., by way of vias to provide electrical connections to and from the circuit elements. In some embodiments, the conductive layers are metal layers referred to as M1 layer, M2 layer, M3 layer etc. with the M1 layer being the lowest metal layer, the M2 layer being the metal layer immediately above the M1 layer etc. When a net has interconnections formed at different conductive layers of the semiconductor device, the net further includes one or more vias to electrically connect the interconnections formed at the different conductive layers.

The placement and routing tool 200 includes a placer (or placing tool) 210 and a router (or routing tool) 220. The placer 210 receives an input 230, for example, a schematic netlist representing the design of the semiconductor device as described with respect to FIG. 1. The placer 210 performs a placement operation to place the circuit elements of the semiconductor device at corresponding physical positions in the layout being generated for the semiconductor device. In at least one embodiment, the circuit elements, which are to be electrically connected to each other, are placed by the placer 210 in close proximity to each other, for reducing the area of the semiconductor device and/or reducing time delays of signals travelling over the interconnections or nets connecting the electrically connected circuit elements. After the placement operation, the router 220 performs a routing operation to route various nets interconnecting the placed circuit elements. In some embodiments, a net includes one or more interconnections electrically connecting the corresponding pins of the circuit elements with each other. The routing operation is performed to ensure that the routed interconnections satisfy a set of constraints. When the set of constraints is satisfied, the layout is outputted, as indicated at 240, to a subsequent design stage, for example, the verification stage described with respect to FIG. 1.

In some embodiments, the placer 210 generates a layer assignment which assigns the interconnections to corresponding conductive layers of the semiconductor device. The layer assignment is generated before the interconnections are routed by the router 220. The layer assignment is sent from the placer 210 to the router 220, and the router 220 performs the routing operation to route the interconnections in accordance with the layer assignment. For example, if the layer assignment specifies that first and second interconnections are to be routed in the M1 layer and third and fourth interconnections are to be routed in the M2 layer, the router 220 will honor the layer assignment and attempt to route the first and second interconnections in the specified M1 layer, and the third and fourth interconnections in the specified M2 layer. The router 220 then checks the routed interconnections for compliance with the set of constraints. In at least one embodiment, if one or more constraints are unsatisfied, the router 220 will make a modification to the routing plan for rearranging one or more of the interconnections to attempt to satisfy the violated constraint(s). If one or more constraints remain unsatisfied after a number of modifications to the routing plan, the router 220 reports one or more invalid interconnections, which do not satisfy at least one constraint, to the placer 210. The placer 210 adjusts the layer assignment based on the report of invalid interconnections received from the router 220. For example, if the router 220 reports an invalid interconnection on the M2 layer, the placer 210 re-assigns, in at least one embodiment, the invalid interconnection to another conductive layer, e.g., the M3 layer. Alternatively, the placer 210 re-assigns, in at least one embodiment, one or more interconnections adjacent the invalid interconnections on the M2 layer to another conductive layer, e.g., the M1 layer. The adjusted layer assignment is sent to the router 220 which then re-routes one or more interconnections in accordance with the adjusted layer assignment. In one or more embodiments, the described process is performed in several iterations to obtain a layout that satisfies the set of constraints.

In some embodiments, one or more constraints in the set of constraints are time constraints. The time constraints are imposed to reduce the likelihood that the manufactured semiconductor device exhibits excessive time delays which lead to signal degradation. Time delays of the interconnections are estimated and checked against the imposed time constraints to verify whether the time constraints are satisfied. The accuracy of time delay estimation is a consideration in the design process, because inaccurately estimated time delays are likely to result in a less-than-optimal layout and/or increase the time and/or computational resources for generating and/or optimizing the layout.

In some embodiments, time delays of the interconnections are estimated by using a delay model, and estimated resistances and capacitances of the interconnections. An example delay model is the Elmore delay model. Other delay models are within the scope of various embodiments. The estimated resistances and capacitances of each interconnection are calculated based on an estimated length (also referred to as "wire length") of the interconnection, and the specific resistance and specific capacitance of the conductive layer in which the interconnection is to be routed. Specific resistances and capacitances vary from one conductive layer to another conductive layer, for example, as indicated in Table I below which shows specific resistances and capacitances (in normalized values) of various layers M1, M2, . . . M10.

TABLE I

|  | M1 | M2 | M3 | M4 | M5 | M6 | M7 | M8 | M9 | M10 |
| --- | --- | --- | --- | --- | --- | --- | --- | --- | --- | --- |
| Normalized capacitance | 1 | 1.01 | 1.01 | 1.01 | 1.02 | 1.03 | 1.03 | 1.04 | 1.04 | 1.05 |
| Normalized resistance | 1 | 0.98 | 0.95 | 0.5 | 0.5 | 0.2 | 0.2 | 0.1 | 0.1 | 0.03 |

The specific capacitance increases from the lowest conductive layer, i.e., the M1 layer, toward the highest conductive layer, i.e., the M10 layer. The specific capacitance variance is about 5 percent between the lowest conductive layer and the highest conductive layer. The specific resistance decreases from the lowest conductive layer, i.e., the M1 layer, toward the highest conductive layer, i.e., the M10 layer. The specific resistance varies about 30 times between the lowest conductive layer and the highest conductive layer. If a single, derived specific resistance and a single, derived specific capacitance are used for all conductive layers for time delay estimation, significant inaccuracy is likely. For example, when an average specific capacitance 1.024 of the specific capacitances of the layers M1-M10 and an average specific resistance 0.456 of the specific resistances of the layers M1-M10 are used for time delay estimation in all layers M1-M10, significant inaccuracy occurs due to at least the specific resistance variance, because the average specific resistance 0.456 significantly differs from the actual specific resistances of most of the conductive layers, e.g., the M1-M3 and M6-M10 layers.

In some embodiments, the described layer assignment of interconnections to corresponding conductive layers makes the information on conductive layers, in which the interconnections are to be routed, available in an early stage of the design process, e.g., even before the interconnections are routed. Therefore, it is possible to estimate time delays of the interconnections by using the specific resistances and/or specific capacitances of the corresponding conductive layers, rather than by a derived specific capacitance and/or a derived specific resistance. For example, time delays of the interconnections assigned to the M2 layer are estimated using the specific resistance 0.98 and/or the specific capacitance 1.01 of the M2 layer, whereas time delays of the interconnections assigned to the M7 layer are estimated using the specific resistance 0.2 and/or the specific capacitance 1.03 of the M7 layer, etc. As a result, it is possible to accurately estimate the time delays of the interconnections. In at least one embodiment, the estimated time delays are checked to satisfy the time constraints before the interconnections are routed. As a result, when the interconnections are actually routed in the corresponding assigned conductive layers, the likelihood that the routed interconnections satisfy the time constraints is increased and the number of iterations in the placement and routing operation is reduced.

Figure 3:
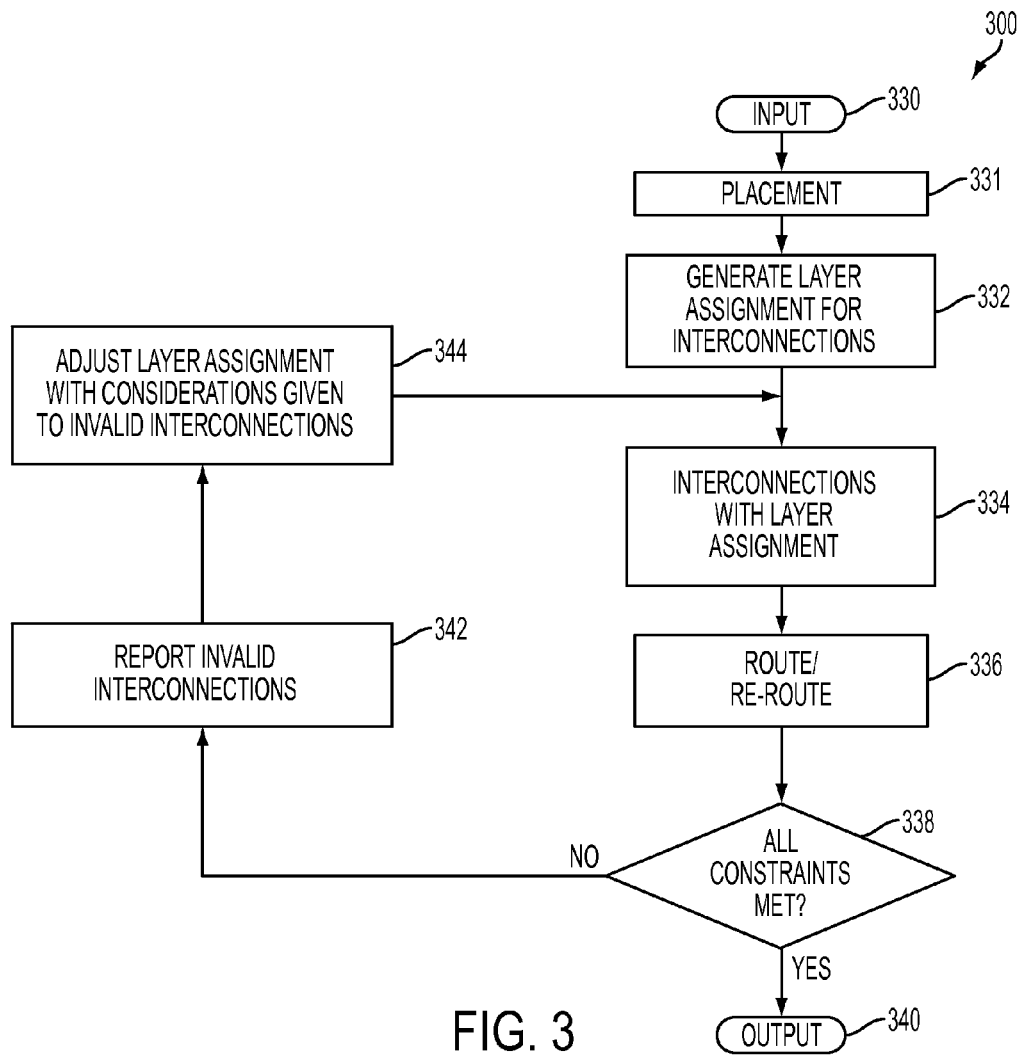
FIG. 3 is a flow chart of a method of operation of a placement and routing tool in accordance with some embodiments.

FIG. 3 is a flow chart of a method 300 of operation of a placement and routing tool in accordance with some embodiments. FIGS. 3A-3F are schematic views of a portion of a layout for a semiconductor device being developed at various stages by the placement and routing tool in accordance with some embodiments. In some embodiments, the method 300 is performed by the placement and routing tool 200.

At operation 330, input data is received by the placement and routing tool. For example, a schematic netlist representing the design of the semiconductor device is inputted into the placement and routing tool 200, as described with respect to FIG. 2.

At operation 331, a placement operation is performed to place of circuit elements of the semiconductor device at corresponding physical positions in the layout. For example, the placement operation is performed by the placer 210, as described with respect to FIG. 2. FIG. 3A shows a portion of the layout after the placement operation is performed. A circuit element 352 is placed at a corresponding physical position in the layout by the placer 210. Other circuit elements are also placed in the layout, but are not shown for simplicity. The circuit element 352 includes pins 354, 356. The circuit element 352 and the pin 354 are omitted from the other views in FIGS. 3B-3F for simplicity. The pin 356 is to be interconnected with pins 357, 358 of one or more other circuit elements into a net. Pins 361, 362 of further circuit elements are to be connected with each other into another net. There are no interconnections routed at this stage.

At operation 332, a layer assignment is generated for assigning interconnections of the nets to corresponding conductive layers of the semiconductor device. For example, the router 220 generates a layer assignment as described with respect to FIG. 2. FIG. 3B shows a portion of the layout with the interconnections planned to be routed. An interconnection 363 is planned to be routed between the pins 356, 358. An interconnection 364 is planned to be routed between the pins 357, 358. An interconnection 365 is planned to be routed between the pins 361, 362. The interconnection 363 and the interconnection 364 are electrically connected with each other into a net 366. The interconnection 364 defines by itself another net. The interconnection 363 is assigned to a first conductive layer, whereas the interconnection 364, 365 are assigned to a second conductive layer. For example, the first conductive layer is a lower layer, e.g., the M2 layer, and the second conductive layer is a higher layer, e.g., the M3 layer. The interconnections are shown in dot-dot lines in FIG. 3B to indicate that the interconnections are not yet routed.

At operation 334, the layer assignment is sent to a router with the partially generated layout having the circuit elements placed therein. For example, the layer assignment and the partially generated layout are sent from the placer 210 to the router 220 as described with respect to FIG. 2. The router then performs a routing operation in accordance with the layer assignment at operation 336. FIG. 3C shows a portion of the layout with the interconnections 363, 364, and 365 routed in accordance with the layer assignment. Specifically, the interconnection 363 is routed in the lower conductive layer, e.g., the M2 layer, in accordance with the layer assignment described with respect to FIG. 3B. The interconnections 364 and 365 are routed in the higher conductive layer, e.g., the M3 layer, in accordance with the layer assignment described with respect to FIG. 3B. In some embodiments, interconnections in higher conductive layers have a wider width than interconnections in lower conductive layers. This width relationship is reflected in FIG. 3C (as well as FIGS. 3D, 3F, 5B-5D, 6B-6D 7A-7B). Specifically, the interconnection 364 and the interconnection 365 in the higher conductive layer are illustrated in FIG. 3C to have wider widths than the interconnection 363 in the lower conductive layer.

At operation 338, the layout is checked against a set of constraints. If all constraints are satisfied, the layout is outputted at operation 340; otherwise, the router proposes one or more modifications to the routing plan, for example, as described with respect to FIG. 2. If at least one constraint remains unsatisfied after a number of modifications, the router reports one or more invalid interconnections to the placer at operation 342, for example, as described with respect to FIG. 2. FIG. 3D shows a portion of the layout with the invalid interconnections 364 and 365. The interconnections 364 and 365 are routed in the same conductive layer and overlap each other in a region 370. Such an overlapping will cause a short circuit in the semiconductor device and therefore the interconnections 364 and 365 are reported as invalid interconnections. In another example situation, the interconnections 364 and 365 do not overlap, but are routed in so close proximity to each other that one or more capacitance or timing constraints is/are unsatisfied, causing the interconnections 364 and 365 to be reported as invalid interconnections.

At operation 344, the layer assignment is adjusted in response to the report of invalid interconnections. For example, the placer 210 adjusts the layer assignment in response to the report of invalid interconnections from the router 220, as described with respect to FIG. 2. FIG. 3E shows a portion of the layout with the interconnections planned to be re-routed in accordance with the adjusted layer assignment. In at least one embodiment, at least one of the invalid interconnections 364, 365 is re-assigned to a different conductive layer to avoid the overlapping or close proximity with the other. If the different conductive layer is higher than the conductive layer currently assigned to the invalid interconnections 364, 365, the re-assignment is referred to as "layer promotion." If the different conductive layer is lower than the conductive layer currently assigned to the invalid interconnections 364, 365, the re-assignment is referred to as "layer demotion." This layer re-assignment is similar to the situation described herein with respect to FIGS. 7A-7B. In at least one embodiment, another interconnection (not shown) in the same conductive layer as the invalid interconnections 364, 365 is re-assigned to a different conductive layer. As a result, the routing resources (e.g., empty areas for routing interconnections and/or ensuring proper spacing between adjacent interconnections) on the conductive layer of the invalid interconnections 364, 365 are increased, permitting one of the invalid interconnections 364, 365 to be re-routed at a new position further away from the other. For example, as shown in FIG. 3E, due to the increased routing resources on the current conductive layer, it is possible to re-route the invalid interconnection 365 as a new interconnections 365' further away from the other invalid interconnection 364. The interconnections are shown in dot-dot lines in FIG. 3E to indicate that the interconnections are not yet finally re-routed.

The method then returns to operation 334 at which the adjusted layer assignment is sent to the router. The router then performs a re-routing operation in accordance with the adjusted layer assignment at operation 336. In at least one embodiment, the interconnections being re-assigned in the adjusted layer assignment are re-routed. FIG. 3F shows a portion of the layout with the interconnections 363, 364, and 365' re-routed in accordance with the adjusted layer assignment. The re-routed interconnection 365' no longer overlaps or is too close to the interconnection 364, satisfying all constraints and making both interconnections valid. The placement and routing operation then terminates at operation 340. However, if there is at least one constraint remaining unsatisfied, the method proceeds to one or more further iterations to optimize the layout. In some embodiments, the described method is performed iteratively until the layout satisfies all constraints, or until a determination is made either to run a re-placement operation for re-placing the circuit elements and/or the corresponding pins or to re-design the semiconductor device.

Figure 4:
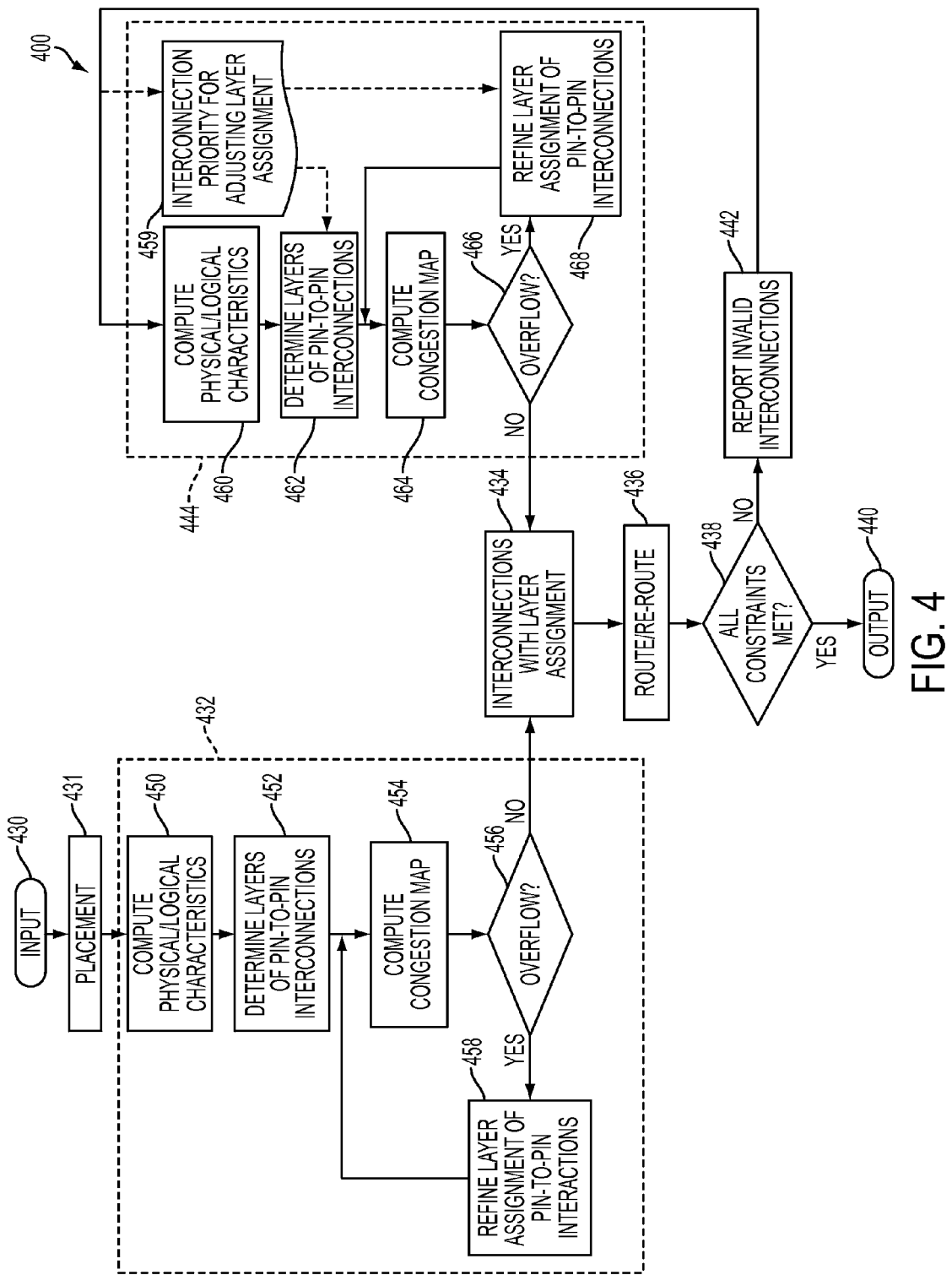
FIG. 4 is a flow chart of a method of generating a layout for a semiconductor device in accordance with some embodiments.

FIG. 4 is a flow chart of a method 400 of generating a layout for a semiconductor device in accordance with some embodiments. In some embodiments, the method 400 is performed by the placement and routing tool 200. FIGS. 5A-5D, 6A-6D, and 7A-7B are schematic views of various portions of the layout being developed at various stages in accordance with some embodiments. In at least one embodiment, operations 430, 431, 432, 434, 436, 438, 440, 442, 444 in the method 400 correspond to the operations 330, 331, 332, 334, 336, 338, 340, 342, 344 in the method 300. In the description below, the layer assignment operation 432 and the layer assignment adjustment operation 444 in accordance with some embodiments will be described in detail.

The layer assignment operation 432 begins with operation 450 at which one or more characteristics of the interconnections to be routed are calculated. Example characteristics include, but are not limited to, estimated wire length (EWL), driving strength, and fanout number. Example models for estimating wire lengths of interconnections include, but are not limited to, the bounding box model and the Steiner tree model. For example, in the bounding box model, a bounding box is determined as the smallest rectangle that contains all pins of a net. The wire lengths of the interconnections in the net are estimated based on the size of the bounding box. A net has a driver pin and one or more receiver pins. The ability of the net to generate current from the driver pin is referred to as the driving strength of the net. The number of the receiver pins in the net is referred to as the fanout number.

At operation 452, interconnections are assigned to corresponding conductive layers in accordance with one or more of the corresponding characteristics. In some embodiments, EWL, driving strength and fanout number are characteristics used to assign interconnections to the corresponding conductive layers. The longer the EWL of an interconnection, the higher the resistance and capacitance of the interconnection, and the greater the time delay of the interconnection. In at least one embodiment, interconnections with longer EWLs are assigned to higher conductive layers which have lower specific resistances, whereas interconnections with shorter EWLs are assigned to lower conductive layers which have higher specific resistances. In at least one embodiment, interconnections of nets with stronger driving strengths are assigned to higher conductive layers which have lower specific resistances, whereas interconnections of nets with weaker driving strengths are assigned to lower conductive layers which have higher specific resistances. In one or more embodiments, interconnections of nets with greater fanout numbers are assigned to higher conductive layers which have lower specific resistances, whereas interconnections of nets with fewer fanout numbers are assigned to lower conductive layers which have higher specific resistances. It is possible in one or more embodiments to assign different interconnections in the same net to different conductive layers.

In some embodiments, the characteristics are given different priorities for their use in the generation of the layer assignment. For example, in at least one embodiment, EWL is given a priority due to its strong influence on the resistance and the time delay, driving strength is given a middle priority, and the fanout number is given a low priority. Interconnections are first assigned by EWL, then by driving strength and further by fanout number. Table II below shows an example of layer assignment in at least one embodiment.

TABLE II

| EWL | Driving Strength | Fanout number | Assigned Layer |
|---|---|---|---|
| Long | Strong | Few | Low-Resistance layer |
| Long | Strong | More | Low-Resistance layer |
| Long | Weak | Few | High-Resistance layer |
| Long | Weak | More | High-Resistance layer |
| Short | Strong | Few | High-Resistance layer |
| Short | Strong | More | Low-Resistance layer |
| Short | Weak | Few | High-Resistance layer |
| Short | Weak | More | High-Resistance layer |

The example in Table II shows two groups for each characteristic (i.e., Long/Short, Strong/Weak, More/Few etc.) which are used to assign interconnections to two conductive layers (i.e., Low/High-Resistance layers). Other arrangements are within the scope of various embodiments. For example, in at least one embodiment, a more complex algorithm is developed to assign interconnections to more than two conductive layers, e.g., ten conductive layers M1-M10. Such an algorithm further uses more than two groups for at least one of the characteristics and/or considers a different number or set of characteristics to generate the layer assignment. Although timing is described in at least one embodiment as the consideration for generating the layer assignment, it is possible in some embodiments to generate the layer assignment while taking into account other considerations including, but not limited to, power performance, thermal performance, manufacturability, yield, etc.

As described herein time delays of the interconnections are estimated based on the corresponding EWLs and the specific resistances and/or specific capacitances of the corresponding conductive layers to which the interconnections are assigned. In some embodiments, the estimated time delays of the interconnections are used to refine the layer assignment for satisfying a constraint and/or solving a layer assignment conflict. For example, the estimated time delays of the interconnections are compared against a threshold to determine a criticality of the corresponding interconnections. If the time delay of an interconnection is greater than the threshold, the interconnection is identified as a critical interconnection which means that the interconnection is likely to fail a time constraint when the interconnection is routed by the router. In at least one embodiment, the critical interconnection is promoted to a higher conductive layer with a lower specific resistance to lower the time delay of the interconnection, so that the interconnection is no longer critical, increasing the likelihood that the interconnection will satisfy the corresponding time constraint(s) when routed by the router.

Figure 5A:
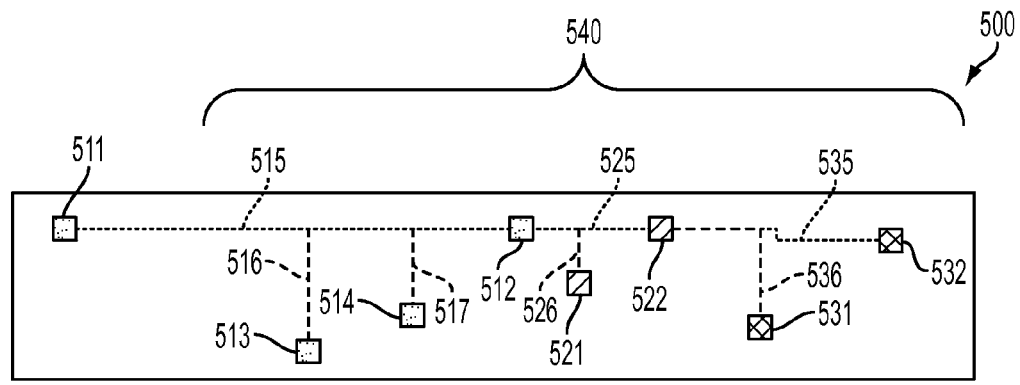
FIGS. 5A-5D, 6A-6D and 7A-7B are schematic views of various portions of a layout for a semiconductor device being developed at various stages in accordance with some embodiments.

In another example described herein with respect to FIGS. 5A-5D, estimated time delays of the interconnections are used to determine criticality of a signal path which includes a number of interconnections of one or more nets connected with each other. FIGS. 5A-5D are schematic views of a portion 500 of the layout having a critical signal path at various stages of the design process in accordance with some embodiments. FIG. 5A shows the layout portion 500 after the placement operation 431. The layout portion 500 includes a first net defined by pins 511, 512, 513, 514, an interconnection 515 connecting pins 511, 512, an interconnection 516 connecting pins 511, 513, and an interconnection 517 connecting pins 512, 514. The layout portion 500 also includes a second net defined by pins 512, 521, 522, an interconnection 525 connecting pins 512, 522, and an interconnection 526 connecting pins 512, 521. The layout portion 500 further includes a third net defined by pins 522, 531, 532, an interconnection 535 connecting pins 522, 532, and an interconnection 536 connecting pins 522, 531. A signal path 540 from pin 511 to pin 532 is defined by interconnections 515, 525 and 535. Time delays are estimated for the interconnections and a time delay of the signal path 540 is estimated as a sum of the estimated time delays of the interconnections 515, 525 and 535. The estimated time delay of the signal path 540 is compared against a threshold to determine a criticality of the signal path 540. If the time delay of the signal path 540 is greater than the threshold, the signal path 540 is identified as a critical signal path which means that the signal path 540 is likely to fail a time constraint when the interconnections are routed by the router.

Figure 5B:
Figure 5B:
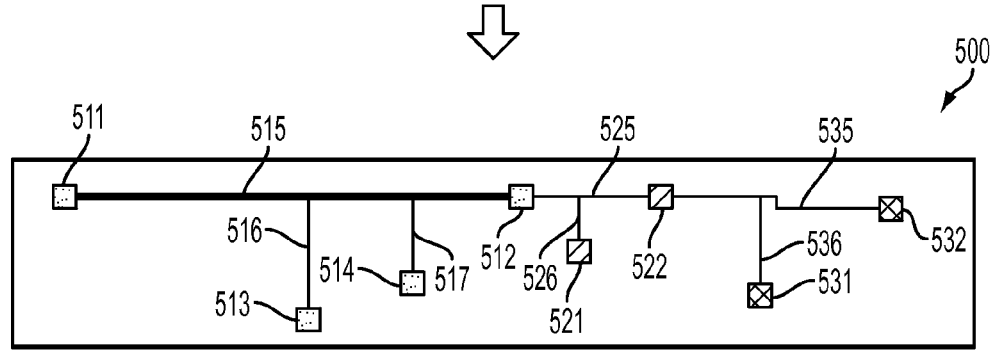
Figure 5C:
Figure 5C:
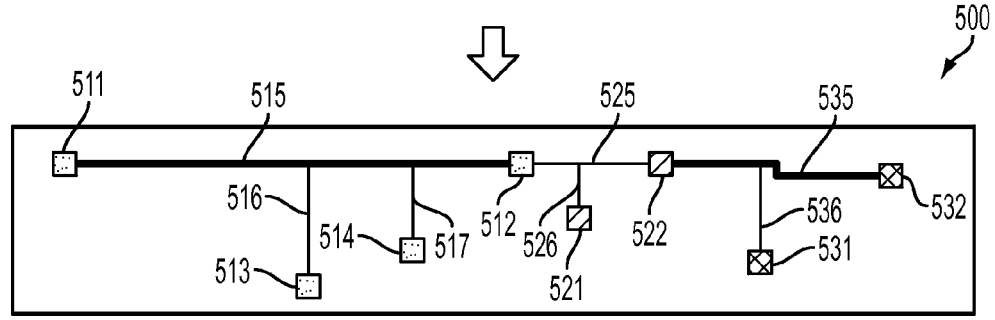
Figure 5D:
Figure 5D:
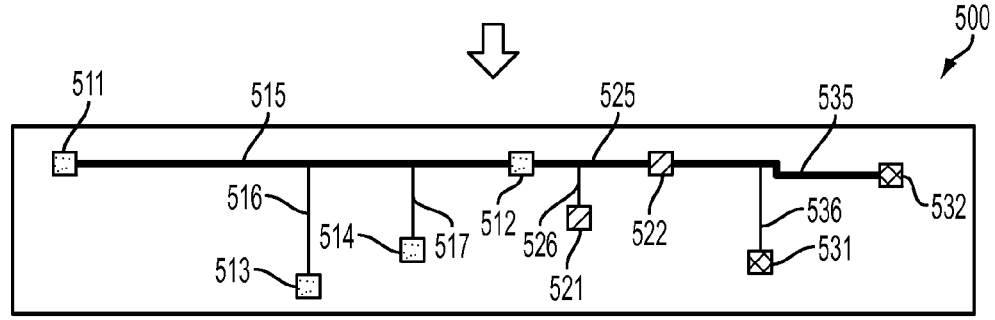

In at least one embodiment, the interconnections constituting a critical signal path are promoted one by one to a higher conductive layer, for reducing the time delay of the signal path, until the signal path 540 is no longer a critical signal path. For example, FIG. 5B shows the layout portion 500 after the interconnection 515 is promoted to the higher conductive layer. The time delay of at least the promoted interconnection 515 is re-estimated based on the specific resistance and/or the specific capacitance of the higher conductive layer. The time delay of the signal path 540 is re-estimated and checked against the threshold. If the re-estimated time delay of the signal path 540 is not greater than the threshold, the signal path 540 is no longer a critical path and the design process proceeds to the next stage. However, if the re-estimated time delay of the signal path 540 is still greater than the threshold, the next interconnection 535 is promoted, as shown in FIG. 5C. The time delay of at least the promoted interconnection 535 is re-estimated, and the time delay of the signal path 540 is re-estimated and checked against the threshold. If the re-estimated time delay of the signal path 540 is not greater than the threshold, the signal path 540 is no longer a critical path and the design process proceeds to the next stage. However, if the re-estimated time delay of the signal path 540 is still greater than the threshold, the next interconnection 525 is promoted, as shown in FIG. 5D. In some embodiments, the process repeats to promote the interconnections 515, 525, 535 to an even higher conductive layers if the time delay of the signal path 540 is still greater than the threshold after the promotion described with respect to FIG. 5D.

In the described layer promotion in accordance with some embodiments, the sequence in which the interconnections 515, 525, 535 are promoted is determined by EWLs of the interconnections 515, 525, 535. For example, the interconnection 515 is the longest interconnection, and has the greatest impact on the time delay of the signal path 540. The interconnection 515 is promoted first to increase the likelihood that the time delay of the signal path 540 will fall below the threshold after the promotion of the interconnection 515, thereby shortening the layer assignment generation process. For a similar reason, the second longest interconnection 535 is promoted after it is determined that the promotion of the interconnection 515 did not bring the time delay of the signal path 540 below the threshold. Other sequences for promoting and/or demoting interconnections are within the scope of various embodiments.

In at least one embodiment, an interconnection is promoted independently of the other interconnection(s) in the same net. For example, as show in FIG. 5B, the interconnections 515 is promoted independently of the interconnections 516, 517 in the first net, with the interconnections 516, 517 remaining at the same conductive layer. Likewise, each of the interconnections 525, 535 is promoted independently of the corresponding interconnection 526, 536. Non-critical interconnections, such as interconnections 516, 517, 526, 527, which do not constitute the signal path, remain at the initial conductive layer. Compared to other approaches where the whole net is promoted and/or all nets included in a critical signal path are promoted (i.e., all interconnections in the layout portion 500 are promoted), the described approach in accordance with some embodiments minimizes routing resources in the higher conductive layers, which are limited due to the wider widths of the interconnections in the higher conductive layers, from being used to route non-critical interconnections. In FIGS. 5B-5D, the interconnections are illustrated in solid lines to show the greater widths of the promoted interconnections compared to the non-critical interconnections which remain at the initial conductive layer. All interconnections in the layout portion 500 are not yet routed at the stages of the design process described with respect to FIGS. 5B-5D.

Figure 6A:
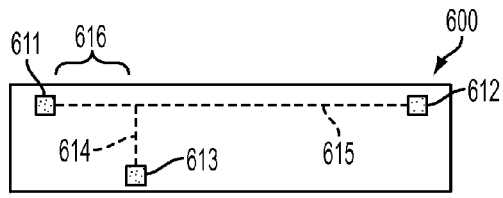
Figure 6B:
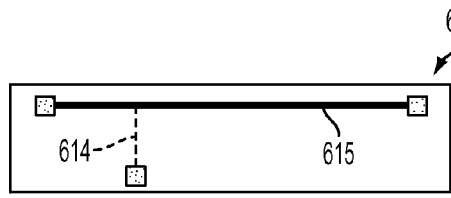
Figure 6D:
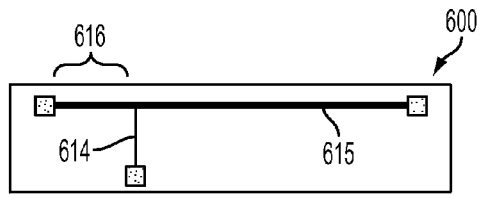
Figure 6C:

FIGS. 6A-6D are schematic views of a portion 600 of the layout having a critical signal path at various stages of the design process in accordance with some embodiments. FIG. 6A shows the layout portion 600 after the placement operation 431. The layout portion 600 includes a net defined by pins 611, 612, 613, an interconnection 614 connecting pins 611, 613, and an interconnection 615 connecting pins 611, 612. The interconnections 614, 615 have an overlapped segment 616. The interconnection 615 is assigned to a higher conductive layer, as best seen in FIG. 6B. The interconnection 614 is assigned to a lower conductive layer, as best seen in FIG. 6C. There is a layer assignment conflict in that it is impossible for the overlapped segment 616 to be assigned to different conductive layers at the same time. Such a layer assignment conflict is resolved in accordance with some embodiments by assigning the overlapped segment 616 to the higher conductive layer, as best seen in FIG. 6D. In situations where an overlapped segment is common for more than two interconnections, the overlapped segment is assigned to the highest conductive layer of the interconnections that share the overlapped segment. Like FIGS. 5B-5D, the interconnections in FIGS. 6B-6D are illustrated in solid lines to show the greater widths of one interconnection compared the other interconnections. All interconnections in the layout portion 600 are not yet routed at the stages of the design process described with respect to FIGS. 6B-6D.

Returning now to FIG. 4, after the layer assignment generation at operation 452 is performed as described above, the process proceeds to operation 454 at which a congestion map is calculated to verify whether the layer assignment is feasible. At operation 456, the calculated congestion map is checked for layer assignment conflicts. In some embodiments, a layer assignment conflict is determined to exist when two or more interconnections are assigned to the same conductive layer in a limited area of the conductive layer. If no layer assignment conflict is found, the process proceeds to operation 434. If a layer assignment conflict is found, the process proceeds to operation 458 where the layer assignment is refined to solve the layer assignment conflict.

Figure 7A:
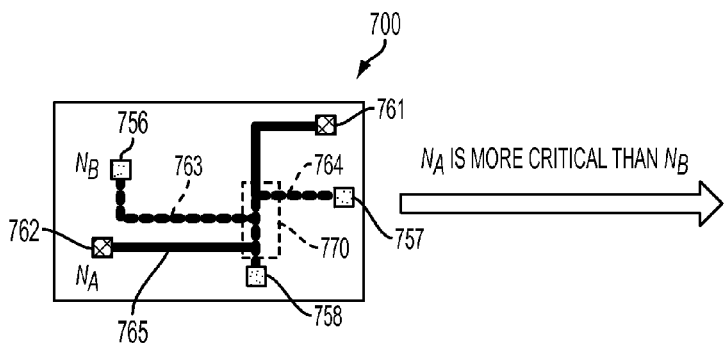
Figure 7B:
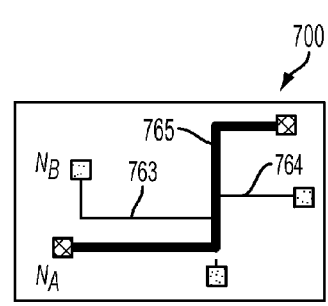

FIGS. 7A-7B are schematic views of a portion 700 of the layout at various stages of the design process in accordance with some embodiments. FIG. 7A show the layout having a layer assignment conflict in the form of net NA and net NB. The layout portion 700 includes pins 756, 757, 758, 761, 762, an interconnection 763 connecting the pins 756, 758, an interconnection 764 connecting the pins 757, 758, and an interconnection 765 connecting the pins 761, 762. The interconnection 763 and the interconnection 764 are electrically connected with each other into the net NB. The interconnection 764 defines by itself the other net NA. Both nets NA and NB are assigned to the same conductive layer in the operation 452. Operations 454, 456 indicate a layer assignment conflict involving conflicting interconnections 764, 765 which are overlapping or in undesirably close proximity with each other in a region 770.

In some embodiments, an approach for solving such a layer assignment conflict is similar to that described with respect to FIG. 3E, i.e., another interconnection in the same conductive layer as the conflicting interconnections 764, 765 is re-assigned to a different conductive layer. As a result, the routing resources (e.g., empty areas for routing interconnections and/or ensuring proper spacing between adjacent interconnections) on the conductive layer of the conflicting interconnections 764, 765 are increased, permitting one of the conflicting interconnections 764, 765 to be re-routed at a new position further away from the other, thereby solving the layer assignment conflict.

In some embodiments, another approach for solving the layer assignment conflict is to use time delays of the conflicting interconnections to determining which interconnection is to be moved to another conductive layer. For example, the net NA has a higher time delay and is more critical than the net NB. In at least one embodiment, based on the criticality of the net NA, the net NA is retained in the same conductive layer, whereas the net NB is demoted to a lower conductive layer, as best seen in FIG. 7B. The overlapping interconnections 764, 765 are now to be routed in different conductive layers, and the layer assignment conflict no longer exists. Alternatively, in at least one embodiment, the net NB is retained in the same conductive layer, whereas the net NA is promoted to a higher conductive layer. Although timing is described in at least one embodiment as the consideration for solving layer assignment conflicts, it is possible in some embodiments to solve layer assignment conflicts while taking into account other considerations including, but not limited to, power performance, thermal performance, manufacturability, yield etc. Like FIGS. 5B-5D and 6A-6D, the interconnections in FIGS. 7A-7D are illustrated in solid lines to show the greater widths of one interconnection compared the other interconnections. All interconnections in the layout portion 700 are not yet routed at the stages of the design process described with respect to FIGS. 7A-7B.

Returning now to FIG. 4, after the layer assignment refinement at operation 458 is performed as described above, the process returns to operation 454. In some embodiments, the process iteratively performs operations 456, 458 until the layer assignment is free of layer assignment conflicts. The process then proceeds to operations 436, 438, 440, 442 as described with respect to operations 336, 338, 340, 342 of FIG. 3. When one or more invalid interconnections are reported to the placer at operation 442, the invalid interconnections are given a higher priority than valid interconnections which satisfy the set of constraints. The priorities of the interconnections are stored in a table or database 459 for use in the layer assignment adjustment operation 444. In some embodiments, the priorities of the interconnections collected over one or more iterations are stored in the database 459 for use in one or more subsequent iterations.

The layer assignment adjustment operation 444 includes operations 460, 462, 464, 466, 466 corresponding to operations 450, 452, 454, 456, 458 of operation 432. A difference between the layer assignment adjustment operations 444 and the layer assignment generation operation 432 includes the additional consideration of the priorities of the interconnections for adjusting the layer assignment in operation 444.

At operation 460, one or more characteristics of the interconnections are calculated. In at least one embodiment, one or more characteristics of the invalid interconnections are re-estimated as described with respect to operation 450. With respect to the valid interconnections, re-estimation of the one or more characteristics is not performed in at least one embodiment; instead, the one or more characteristics estimated during the layer assignment generation operation 432 or the one or more characteristics calculated by the router based on the routed valid interconnections are used.

At operation 462, the re-estimated one or more characteristics of the invalid interconnections are used to adjust the layer assignment for the invalid interconnections. For example, EWL, driving strength, fanout number, time delay etc. are used to assign the invalid interconnections to corresponding conductive layers, using an algorithm similar to that described with respect to operation 452. Additionally, the priorities of the invalid interconnections are read from the database 459 and used to give the invalid interconnections priority over the valid interconnections competing for the same routing resource.

At operation 464, a congestion map is calculated and at operation 466, the calculated congestion map is checked for layer assignment conflicts, in a manner similar to those described with respect to operations 454, 456. If no layer assignment conflict is found, the process proceeds to operation 434. If a layer assignment conflict is found, the process proceeds to operation 468 where the adjusted layer assignment is refined to solve the layer assignment conflict. The priorities of interconnections are read from the database 459 and used in the operation 468.

An example situation includes an invalid interconnection and a valid interconnection both assigned to same conductive layer and having a layer assignment conflict similar to that described with respect to FIG. 7A. For instance, the interconnection 765 of net NA is the invalid interconnection, the interconnection 764 of net NB is the conflicting valid interconnection, and the time delays of the interconnections 764, 765 indicate that both interconnections 764, 765 are critical interconnections. Even though the valid interconnections 764 is a critical interconnection, the higher priority of the invalid interconnection 765 read from the database 459 permits the invalid interconnection 765 to be assigned to the conductive layer, whereas the conflicting valid interconnection 764 is re-assigned to a different conductive layer, e.g., demoted to the lower conductive layer, as illustrated in FIG. 7B. Alternatively, the higher priority of the invalid interconnection 765 permits the invalid interconnection 765 to be promoted to a higher conductive layer, whereas the conflicting valid interconnection 764 is maintained at the current conductive layer. In another example, when two invalid interconnections are both assigned to same conductive layer and have a layer assignment conflict, the invalid interconnection which has the greater time delay (i.e., the more critical invalid interconnection) is given the priority and is assigned to the conductive layer, whereas the conflicting invalid interconnection which has the lower time delay (i.e., the less critical invalid interconnection) is demoted to a lower conductive layer. Alternatively, the more critical invalid interconnection is promoted and the less critical invalid interconnection is maintained at the current conductive layer.

After the refinement of the adjusted layer assignment at operation 458, the process returns to operation 464, iteratively performs operations 466, 468 until the adjusted layer assignment is free of layer assignment conflicts, at which time the adjusted layer assignment is outputted to the router as described with respect to operations 434, 436. In at least one embodiment, the adjusted layer assignment includes not only adjustments to the conductive layers assigned to the invalid interconnections reported by the router from the previous iteration(s), but also adjustments to the conductive layers assigned to the valid interconnections which are re-assigned as the result of one or more of the operations 462, 468. In some embodiments, one or more iterations of the layer assignment adjustment operation 444 are performed before the router finds that all constraints are satisfied at operation 438 and the placement and routing operation is concluded.

Figure 8:
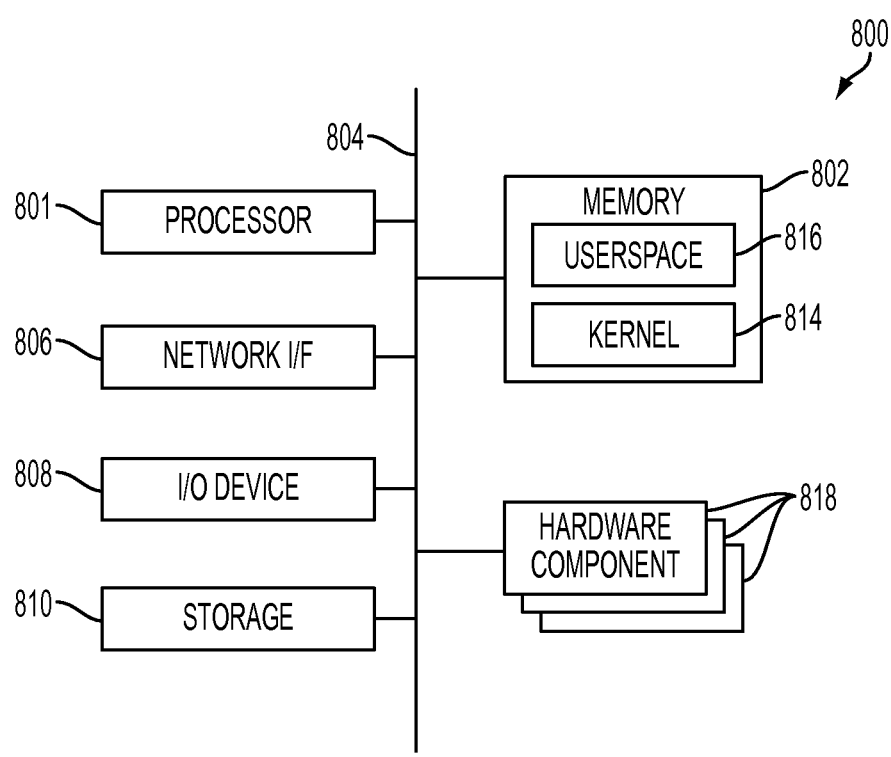
FIG. 8 is a block diagram of a computer system in accordance with some embodiments.

FIG. 8 is a block diagram of a computer system 800 in accordance with some embodiments. One or more of the tools and/or engines and/or systems and/or operations described with respect to FIGS. 1-7B is realized in some embodiments by one or more computer systems 800 of FIG. 8. The system 800 comprises at least one processor 801, a memory 802, a network interface (I/F) 806, a storage 810, an input/output (I/O) device 808 communicatively coupled via a bus 804 or other interconnection communication mechanism.

The memory 802 comprises, in some embodiments, a random access memory (RAM) and/or other dynamic storage device and/or read only memory (ROM) and/or other static storage device, coupled to the bus 804 for storing data and/or instructions to be executed by the processor 801, e.g., kernel 814, userspace 816, portions of the kernel and/or the userspace, and components thereof. The memory 802 is also used, in some embodiments, for storing temporary variables or other intermediate information during execution of instructions to be executed by the processor 801.

In some embodiments, a storage device 810, such as a magnetic disk or optical disk, is coupled to the bus 804 for storing data and/or instructions, e.g., kernel 814, userspace 816, etc. The I/O device 808 comprises an input device, an output device and/or a combined input/output device for enabling user interaction with the system 800. An input device comprises, for example, a keyboard, keypad, mouse, trackball, trackpad, and/or cursor direction keys for communicating information and commands to the processor 801. An output device comprises, for example, a display, a printer, a voice synthesizer, etc. for communicating information to a user.

In some embodiments, one or more operations and/or functionality of the tools and/or engines and/or systems described with respect to FIGS. 1-7B are realized by the processor 801, which is programmed for performing such operations and/or functionality. One or more of the memory 802, the I/F 806, the storage 810, the I/O device 808, the hardware components 818, and the bus 804 is/are operable to receive instructions, data, design constraints, design rules, netlists, layouts, models and/or other parameters for processing by the processor 801.

In some embodiments, one or more of the operations and/or functionality of the tools and/or engines and/or systems described with respect to FIGS. 1-7B is/are implemented by specifically configured hardware (e.g., by one or more application specific integrated circuits (ASICs) which is/are included) separate from or in lieu of the processor 801. Some embodiments incorporate more than one of the described operations and/or functionality in a single ASIC.

In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

The above methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

According to some embodiments, a method is performed at least in part by at least one processor. In the method, a plurality of circuit elements are placed in a layout for a semiconductor device, the plurality of circuit elements having a plurality of pins. A layer assignment is generated to assign a plurality of interconnections to corresponding conductive layers of the semiconductor device, the plurality of interconnections connecting corresponding pairs of pins among the plurality of pins. The plurality of interconnections is routed in the layout in accordance with the layer assignment.

According to some embodiments, a system for generating a layout for a semiconductor device comprises at least one processor configured to perform one or more operations. In the one or more operations, a plurality of circuit elements of the semiconductor device are placed in the layout, the plurality of circuit elements having a plurality of pins. A layer assignment is generated to assign a plurality of interconnections to corresponding conductive layers of the semiconductor device, the plurality of interconnections connecting corresponding pairs of pins among the plurality of pins. The plurality of interconnections is routed in the layout in accordance with the layer assignment.

According to some embodiments, a computer program product comprises a non-transitory, computer-readable medium containing therein instructions which, when executed by at least one processor, cause the at least one processor to perform one or more operations. In the one or more operations, a plurality of circuit elements of the semiconductor device are placed in the layout, the plurality of circuit elements having a plurality of pins. A layer assignment is generated to assign a plurality of interconnections to corresponding conductive layers of the semiconductor device, the plurality of interconnections connecting corresponding pairs of pins among the plurality of pins. The plurality of interconnections is routed in the layout in accordance with the layer assignment.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of making a semiconductor device, the method comprising:
    placing a plurality of circuit elements, by at least one processor, in a layout for the semiconductor device, the plurality of circuit elements having a plurality of pins;
    generating a layer assignment for assigning a plurality of interconnections to corresponding conductive layers of the semiconductor device, wherein the plurality of interconnections is free from routing in the layout during the generation of the layer assignment;
    routing, after generating the layer assignment, the plurality of interconnections in the layout in accordance with the layer assignment, wherein the plurality of interconnections couple corresponding pairs of pins among the plurality of pins;
    determining whether the plurality of routed interconnections satisfies a set of constraints, wherein determining whether the plurality of routed interconnects satisfies the set of constraints is performed independent of a function of the plurality of circuit elements, and whether routed interconnections of the plurality of routed interconnects overlap is a constraint of the set of constraints; and
    manufacturing the semiconductor device incorporating the layer assignment.

2. The method of claim 1, wherein the generating the layer assignment comprises:
    estimating one or more characteristics of each of the plurality of interconnections; and
    assigning each of the plurality of interconnections to the corresponding conductive layer in accordance with the corresponding estimated one or more characteristics.

3. The method of claim 2, wherein
    the one or more characteristics include a wire length of the corresponding interconnection, and
    the generating the layer assignment further comprises estimating time delays of the plurality of interconnections based on at least one of (i) the corresponding wire lengths or (ii) at least one of specific resistance or specific capacitances of the corresponding conductive layers.

4. The method of claim 3, wherein the estimating the time delays comprises using different resistances for corresponding different conductive layers.

5. The method of claim 3, wherein the generating the layer assignment further comprises:
    identifying a critical interconnection among the plurality of interconnections, the critical interconnection having the corresponding time delay greater than a predetermined threshold; and
    re-assigning the critical interconnection to a higher conductive layer among the conductive layers.

6. The method of claim 3, wherein the generating the layer assignment further comprises:
    identifying a layer assignment conflict between at least two conflicting interconnections among the plurality of interconnections, the at least two conflicting interconnections assigned to the same conductive layer among the conductive layers; and
    re-assigning one of the at least two conflicting interconnections to a different conductive layer among the conductive layers.

7. The method of claim 6, wherein a first interconnection of the at least two conflicting interconnections has the time delay greater than a second interconnection of the at least two conflicting interconnections, and the re-assigning comprises:

promoting the first interconnection having the greater time delay to a higher conductive layer among the conductive layers, or demoting the second interconnection having the smaller time delay to a lower conductive layer among the conductive layers.

8. The method of claim 3, wherein first and second interconnections among the plurality of interconnections are electrically connected together into a net, the first and second interconnections having an overlapped segment, the first and second interconnections assigned to corresponding first and second conductive layers among the conductive layers, the first conductive layer higher than the second conductive layer, and the generating the layer assignment further comprises assigning the overlapped segment to the higher, first conductive layer.

9. The method of claim 3, wherein the generating the layer assignment further comprises:

identifying a critical path formed by a number of interconnections among the plurality of interconnections, the critical path having a time delay greater than a predetermined threshold; and promoting the interconnections forming the critical path, one at a time, to a higher conductive layer among the conductive layers until the time delay of the critical path is equal to or lower than the predetermined threshold.

10. The method of claim 9, wherein, in the promoting, the interconnections forming the critical path are sequentially promoted to the higher conductive layer based on the corresponding wire lengths, with the interconnection having the longest wire length being promoted first.

11. The method of claim 3, further comprising:

adjusting the layer assignment upon a determination that at least one routed interconnection among the plurality of routed interconnections is an invalid interconnection that does not satisfy at least one constraint in the set of constraints; and re-routing one or more of the plurality of routed interconnections in accordance with the adjusted layer assignment.

12. The method of claim 11, wherein the adjusting the layer assignment comprises:

giving the invalid interconnection a higher priority than valid interconnections among the plurality of interconnections, the valid interconnections satisfying the set of constraints; and adjusting, based on the higher priority of the invalid interconnection, the layer assignment.

13. The method of claim 12, wherein the adjusting the layer assignment further comprises:

re-estimating the wire length of the invalid interconnection;

re-estimating the time delay of the invalid interconnection based on the re-estimated wire length; and adjusting, based on the re-estimated wire length and re-estimated time delay of the invalid interconnection, the layer assignment.

14. The method of claim 13, wherein the adjusting the layer assignment further comprises:

identifying a layer assignment conflict between the invalid interconnection and another interconnection among the plurality of interconnections, the another interconnection assigned to the same conductive layer among the conductive layers as the invalid interconnection and having a priority lower than the invalid interconnection; and either (i) promoting the invalid interconnection having the higher priority to a higher conductive layer among the conductive layers, or (ii) demoting the another interconnection having the lower priority to a lower conductive layer among the conductive layers.

15. The method of claim 1, wherein a number of interconnections among the plurality of interconnections is electrically connected together to form a net, and the generating the layer assignment comprises:

re-assigning at least one interconnection in the net to a different conductive layer among the conductive layers to solve a layer assignment conflict or to satisfy a constraint, without re-assigning other interconnections in the net.

16. A method of making a semiconductor device, the method comprising:

placing a plurality of circuit elements of the semiconductor device in a layout, the plurality of circuit elements having a plurality of pins;

generating a layer assignment for assigning a plurality of interconnections to corresponding conductive layers of the semiconductor device, wherein the plurality of interconnections is free from routing in the layout during the generation of the layer assignment;

routing, after generating the layer assignment, the plurality of interconnections in the layout in accordance with the layer assignment, wherein the plurality of interconnections couple corresponding pairs of pins among the plurality of pins;

determining whether the plurality of routed interconnections satisfies a set of constraints, wherein the set of constraints includes a proximity of adjacent routed interconnects of the plurality of routed interconnects and whether routed interconnections of the plurality of routed interconnects overlap, and the set of constraints is independent of a function of the plurality of circuit elements; and manufacturing the semiconductor device incorporating the layer assignment.

17. The method of claim 16, further comprising estimating time delays of the plurality of interconnections based on at least one of specific resistances or specific capacitances of the corresponding conductive layers; and based on one or more of the estimated time delays, re-assigning at least one of the interconnections to a different conductive layer among the conductive layers, for solving a layer assignment conflict or satisfying a constraint.

18. The method of claim 16, wherein a number of interconnections among the plurality of interconnections is electrically connected together into a net, and re-assigning at least one interconnection in the net to a different conductive layer among the conductive layers to solve a layer assignment conflict or to satisfy a constraint, without re-assigning other interconnections in the net.

19. The method of claim 16, further comprising adjusting the layer assignment upon a determination that at least one routed interconnection among the plurality of routed interconnections does not satisfy at least one constraint in the set of constraints; and re-routing one or more of the plurality of routed interconnections in accordance with the adjusted layer assignment.

20. A method of making a semiconductor device, the method comprising:

placing a plurality of circuit elements of the semiconductor device in a layout, the plurality of circuit elements having a plurality of pins;

generating a layer assignment for assigning a plurality of interconnections to corresponding conductive layers of the semiconductor device, wherein the plurality of interconnections is free from routing in the layout during the generation of the layer assignment;

routing, after generating the layer assignment, the plurality of interconnections in the assigned corresponding conductive layers of the semiconductor device, wherein the plurality of interconnects couple corresponding pairs of pins among the plurality of pins;

estimating time delays of the plurality of interconnections based on at least one of specific resistances or specific capacitances of the corresponding conductive layers;

determining whether the plurality of routed interconnections satisfies a set of constraints, wherein determining whether the plurality of routed interconnects satisfies the set of constraints is performed independent of a function of the plurality of circuit elements, and whether routed interconnections of the plurality of routed interconnects overlap is a constraint of the set of constraints; and manufacturing the semiconductor device incorporating the layer assignment.

* * * * *